United States Patent [19]

Hart

[11] Patent Number: 4,855,358

[45] Date of Patent: Aug. 8, 1989

[54] POWDER COATING CONTAINING AN EPOXY RESIN, ACRYLIC RESIN AND POLYAMIDE

[75] Inventor: Stephen C. Hart, Warsaw, Ind.

[73] Assignee: Morton Thiokol, Inc., Chicago, Ill.

[21] Appl. No.: 681,521

[22] Filed: Dec. 14, 1984

[51] Int. Cl.$^4$ .............................................. C08L 63/02
[52] U.S. Cl. ................... 525/113; 525/119; 525/934
[58] Field of Search ................ 525/113, 934, 119

[56] References Cited

U.S. PATENT DOCUMENTS

| | | |
|---|---|---|
| 3,201,271 | 8/1965 | Simmons, Jr. et al. ............. 525/113 |
| 3,864,426 | 2/1975 | Salensky ............................. 525/113 |
| 4,517,340 | 5/1985 | Read et al. .......................... 525/113 |

FOREIGN PATENT DOCUMENTS

| | | |
|---|---|---|
| 0695577 | 10/1964 | Canada ................................. 525/113 |
| 0700271 | 12/1964 | Canada ................................. 525/113 |
| 2055109 | 2/1981 | United Kingdom ................. 525/113 |

OTHER PUBLICATIONS

The Dow Chemical Co., "Dow Experimental Hardener XD-8062", Midland, MI, Designed Products Dept., 1975.

The Detroit for Paint Technology, "Powder Coating: Why-How-When", vol. 44, No. 565, Feb. 1972, pp. 30-37.

The Condensed Chemical Dictionary, p. 856, Ninth Edition, 1977 (Hawley), Epoxy Resins, pp. 19-20, McGraw-Hill, 1957 (Lee et al.).

Primary Examiner—John C. Bleutge
Assistant Examiner—Robert E. L. Sellers, II
Attorney, Agent, or Firm—Richard J. Sheridan; Gerald K. White

[57] ABSTRACT

Thermosetting powder coatings are provided which comprise a high epoxide equivalent weight epoxy resin or mixture of epoxy resins, a cure catalyst for the epoxy resin, an acrylic resin and a polyamide resin. These powder coatings are useful for forming corrosion resistant, essentially crack-free coating on metal cable, especially cable which is subjected to post-tensioning.

1 Claim, No Drawings

POWDER COATING CONTAINING AN EPOXY RESIN, ACRYLIC RESIN AND POLYAMIDE

BACKGROUND OF THE INVENTION

1. Field of the Invention

This invention relates to compositions useful as thermosetting powder coatings. These compositions are used as protective coatings for cables which require tensioning or stressing after the cable has been coated and the coating cured. These "post-tensioned" cables are used, e.g., for structural support in bridges.

2. Description of the Prior Art

Steel cable used for structural support in bridges is subjected to tensioning in concrete. Since these cables are subject to corrosion they are generally coated with a material which will provide corrosion resistance. Such coatings, however, have been susceptible to cracking during tensioning of the cable since they lack the flexibility required to withstand the tensioning forces. Once the coating developed these post-tensioning cracks, its ability to protect the cable against corrosion was severely reduced. Thus, it would be highly desirable to coat the cable with a material which does not crack upon tensioning of the cable.

SUMMARY OF THE INVENTION

In accordance with the present invention there is provided a thermosetting powder coating composition comprising a high epoxide equivalent weight epoxy resin or mixture of epoxy resins, a cure catalyst for the epoxy resin, an acrylic resin and a polyamide resin. It has been discovered that the thermosetting powder coating compositions of this invention provide coatings which have sufficient flexibility to prevent cracking of the coating and are, therefore, useful for providing essentially crack-free, corrosion resistant coatings on cable, especially post-tensioned cable (i.e., cable which is tensioned after coating). This invention further provides a process for protecting a metal cable against corrosion comprising applying to the cable a thermosetting powder coating composition comprising a high epoxide equivalent weight epoxy resin or mixture of epoxy resins, a cure catalyst for the epoxy resin, an acrylic resin and a polyamide resin, and curing said powder coating said cable, whereby an essentially crack-free coating is formed on the cable. Following curing of the coating the cable can be tensioned and the coating will remain essentially crack-free.

Also provided by this invention is a corrosion resistant, metal cable comprising a metal cable coated with an essentially crack-free layer of a cured thermosetting powder coating which in its uncured state comprises a high epoxide equivalent weight epoxy resin or mixture of epoxy resins, a cure catalyst for the epoxy resin, an acrylic resin and a polyamide resin. The cable may also be in the tensioned state with the coated layer remaining essentially crack-free.

DETAILED DESCRIPTION OF THE PREFERRED EMBODIMENTS

The high equivalent weight epoxy resins useful in the thermosetting powder coatings of this invention are solid resins which are the reaction products of a diol and a halohydrin. Epoxy resins which are useful in the practice of this invention are exemplified by, but are not limited to, resins produced by reacting epichlorohydrin and bisphenol A. Preferred epoxy resins include those sold by Shell Chemical Company under the designation "EPON", such as EPON Resin 1007F, EPON Resin 1009F and EPON Resin 1004, all of which are 4,4'-isopropylidenediphenol-epichlorohydrin resins.

The epoxy resin component of the thermosetting powder coating compositions of this invention has a high epoxide equivalent weight. Typically, the epoxide equivalent weight of the epoxy resin component will be at least about 2250. When mixtures of epoxy resins are employed in the epoxy resin component, the epoxide equivalent weights of some of the individual epoxy resins may be below about 2250, but the epoxide equivalent weight of the mixture, i.e., the weighted average of the epoxide equivalent weights of the individual resins, should be at least about 2250. Thus, a typical epoxy resin component of the powder coatings of this invention may comprise:

| EPOXY RESIN | EPOXIDE EQUIVALENT WEIGHT (APPROX.) | PARTS BY WEIGHT |
| --- | --- | --- |
| EPON Resin 1007F | 2000 | 50.0 |
| EPON Resin 1009F | 2800 | 50.0 |
| EPON Resin 1004 | 910 | 10.0 | which provides an epoxy resin component with a weighted average epoxide equivalent weight of about 2265.

It is believed that the high equivalent weight of the epoxy resin component is at least partially responsible for the excellent flexibility or elongation of the cured powder coating.

The epoxy resin reacts via homopolymerization during curing of the coating. Generally, a catalyst is required to permit this reaction to occur at a commercially acceptable rate. A particularly preferred cure catalyst is 2-methylimidazole. It is believed this catalyst promotes the formation of ether linkages during the homopolymerization of the epoxy resins via the following reaction mechanism:

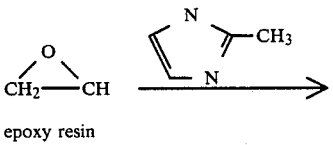

epoxy resin

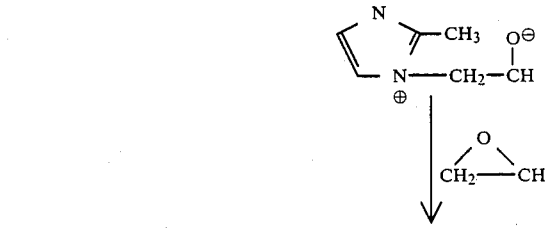

-continued

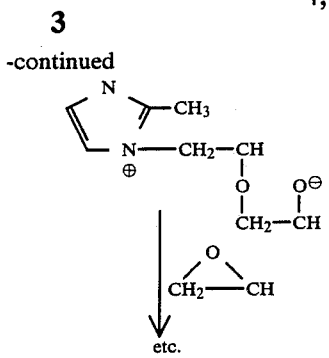

etc.

It is further believed that, along with the aforementioned high epoxide equivalent weight, these ether linkages contribute to the flexibility of the cured coating.

The acrylic resins which may be employed in the thermosetting powder coating compositions of this invention are generally liquids which have been converted to powder form by absorption onto silica-type materials. These acrylic resins function as melt flow control agents. Exemplary of the acrylic resins is Resiflow P acrylic resin sold by SBS Chemicals, Inc. which is a 2-propenoic acid, ethyl ester polymer.

I accordance with the present invention, the thermosetting powder coating compositions also contain a polyamide resin adhesion promoter. Examples of such polyamide resins include, but are not limited to, those sold by General Mills Chemicals, Inc. under the designation "Versamid" which are the condensation products of polyamines and the dibasic acids obtained when certain unsaturated fatty acids are polymerized, e.g. the 9, 12-octadecandienoic acid (Z,Z)-, dimer, polymer with 1,2-ethanediamine. Versamid 754 polyamide is a preferred polyamide resin.

In addition to the the above components, the thermosetting powder coatings of this invention may contain additional additives. For examples, a coloring agent may be added to the powder coating composition should a colored coating be desired. Fumed silica may also be employed as a powder flow additive. A preferred fumed silica is sold by Cabot Corporation under the trademark CAB-O-SIL. Other possible additives include slip or antimar additives, such as dimethyl, methyl phenethyl and trimethylsilyl-terminated siloxanes and silicones, or polyethylene.

The components of the thermosetting powder coating compositions of this invention are employed in the amounts indicated in Table A below.

TABLE A

| COMPONENT | PARTS BY WEIGHT | |
|---|---|---|
| | GENERAL | PREFERRED |
| Epoxy resin | 80 to 130 | 90 to 120 |
| Cure catalyst | 0.1 to 3.0 | 0.4 to 0.8 |
| Acrylic resin | 0.5 to 3.0 | 1.0 to 2.0 |
| Polyamide resin | 0.5 to 10.0 | 0.75 to 2.0 |
| Coloring agent | 0 to 50.0 | 0.1 to 1.5 |
| Fumed silica | 0 to 1.0 | 0.1 to 0.3 |

The thermosetting powder coating compositions of this invention are prepared by conventional techniques employed in the powder coating art. The components, with the exception of the powder flow additive, are blended together thoroughly. The resulting mixture is then melt mixed, for example in an extruder or on a two roll mill. The resulting product, usually in sheet form, is broken into chips, and blended with the powder flow additive in a low intensity blender. The resulting product is then ground to a powder on, for example, a hammermill and sieved to achieve the desired particle size.

The powder coating composition of this invention may be applied to the cable and cured using standard techniques employed in the powder coating art. For example, the cable may be heated to about 450° F. and then the powder coating can be applied electrostatically. The residual heat in the cable causes the powder coating to melt and cure.

The following examples illustrate the present invention and are not intended to limit the invention in any manner.

EXAMPLE 1

A thermosetting powder coating composition in accordance with this invention was prepared from the components indicated in Table 1.

TABLE 1

| COMPONENT | PARTS BY WEIGHT |
|---|---|
| Epoxy resin (EPON Resin 1007F, epoxide equivalent weight about 2000) | 50.0 |
| Epoxy resin (EPON Resin 1009F, epoxide equivalent weight about 2800) | 50.0 |
| Epoxy resin (EPON Resin 1004, epoxy equivalent weight about 910) | 10.0 |
| Masterbatch of 95 wt % 2-methylimidazole/5 wt % fumed silica | 0.6 |
| Acrylic resin (Resiflow P acrylic resin) | 1.5 |
| Polyamide resin (Versamid 754 polyamide resin) | 1.0 |
| Colorant | 0.8 |
| Fumed silica | 0.1 |

The above components, except for the fumed silica, were mixed together in a low intensity blender, melt mixed in an extruder, broken into chips and then the chips were blended with the fumed silica in a low intensity blender. The resulting mixture was ground to powder in a hammermill and seived to a achieve the desired particle size.

EXAMPLE 2

A powder coating was prepared as in Example 1 using the components shown in Table 2.

TABLE 2

| COMPONENT | PARTS BY WEIGHT |
|---|---|
| Epoxy resin (EPON Resin 1007F, epoxide equivalent weight about 2000) | 50.0 |
| Epoxy resin (EPON Resin 1009F, epoxide equivalent weight about 2800) | 50.0 |
| Masterbatch of 95 wt % 2-methylimidazole/5 wt % fumed silica | 0.6 |
| Acrylic resin (Resiflow P acrylic resin) | 1.5 |
| Polyamide resin (Versamid 754 polyamide resin) | 1.0 |
| Colorant | 0.8 |

Cable coatings are normally applied at film thicknesses in the range of 25 to 35 mils or 15 to 20 mils. The powder coatings prepared in Examples 1 and 2 were applied to cable at film thicknesses up to and including these ranges and demonstrated excellent flexibility and elongation characteristics, resulting in essentially crack-free coatings, even after tensioning the cable.

What I claim is:

1. A thermosetting powder coating comprising a blend which comprises about 80 to 130 parts by weight of an epoxy resin or mixture of epoxy resins having an epoxide equivalent weight of at least about 2250, about 0.1 to about 3.0 parts by weight of a cure catalyst for the epoxy resin, about 0.5 to 3.0 parts by weight of an acrylic resin, and about 0.5 to about 10.0 parts by weight of a polyamide resin, wherein said blend is in the form of a powder.

* * * * *